United States Patent [19]

Ogihara

[11] Patent Number: 5,523,929
[45] Date of Patent: Jun. 4, 1996

[54] LIGHT EMISSION APPARATUS

[75] Inventor: Takehiko Ogihara, Hoya, Japan

[73] Assignee: Musashino Kikuo Co., Ltd., Tokyo, Japan

[21] Appl. No.: 386,056

[22] Filed: Feb. 7, 1995

[30] Foreign Application Priority Data

Jun. 24, 1994 [JP] Japan .................................. 6-164907

[51] Int. Cl.⁶ ........................................... F21L 11/00
[52] U.S. Cl. ........................ 362/183; 362/276; 362/427; 362/802
[58] Field of Search ............................. 362/183, 186, 362/190, 191, 276, 363, 427, 802

[56] References Cited

U.S. PATENT DOCUMENTS 5,036,443  7/1991  Humble et al. ....................... 362/183
5,152,601  10/1992  Ferng ...................................... 362/183

FOREIGN PATENT DOCUMENTS 2-30003  1/1990  Japan .

*Primary Examiner*—Stephen F. Husar
*Attorney, Agent, or Firm*—Wenderoth, Lind & Ponack

[57] ABSTRACT

A light emission apparatus that emits light to draw people's attention at night includes a solar cell, a storage battery, a control unit; a light-emiting diode, and a transparent or partly transparent case. The control unit performs control in such a way that in the daytime the solar cell that receives sunlight charges the storage battery and, at night the light-emitting diode emits light or blinks by the electricity supplied from the storage battery.

4 Claims, 3 Drawing Sheets

LIGHT EMISSION APPARATUS

BACKGROUND OF THE INVENTION

1. Field of the Invention

The present invention relates to a light emission apparatus that emits light to draw people's attention at night.

Conventional light emission apparatus of this kind use commercial electric power for emitting light.

Thus, the conventional light emission apparatus requires wiring work for installation and usage charges for electricity, and is therefore expensive as a whole. This invention provides an inexpensive light emission apparatus that allows easy installation requiring no wiring work and utilizes solar energy for light emission, making it unnecessary to use commercial electricity.

SUMMARY OF THE INVENTION

The light emission apparatus of this invention, includes a solar cell; a storage battery; a control unit; a light-emitting diode; and a transparent or partly transparent case containing the solar cell, the storage battery, the control unit and the light-emitting diode; wherein according to the brightness of surroundings the control unit performs control in such a way that in the daytime the solar cell that receives sunlight charges the storage battery and, in the night, the light-emitting diode is lighted or blinked by the electricity supplied from the storage battery. A light emission unit consisting integrally of the solar cell, the storage battery, the light-emittinig diode and the control circuit may be supported on a shaft in the transparent case and the center of gravity of the light emission unit may be located opposite to a light receiving surface of the solar cell with respect to the shaft so that the light receiving surface always faces upward.

Because of the construction mentioned above, the light emission apparatus of the present invention obviates wiring work for installation. After installation, the apparatus generates power by a solar cell and stores electricity in a storage battery during the daytime and, during the night, lights up or blinks a light-emitting diode (LED) by using electricity from the storage battery, with the day-night switching operation automatically controlled by a control unit, requiring no maintenance at all.

If the light emission unit consisting integrally of a solar cell, a storage battery, an LED and a control circuit is enclosed in a transparent case and supported on a shaft and if its center of gravity is located opposite to the solar cell's light receiving surface with respect to the shaft so that the light receiving surface always faces up, the amount of sunlight received by the light receicing surface does not vary greatly, ensuring stable charge, at whatever angle, from horizontal to vertical, or in whatever direction the light emission apparatus may be installed.

DETAILED DESCRIPTION OF THE INVENTION

With reference to the accompanying drawings, the present invention will be described in detail.

Figure 1:
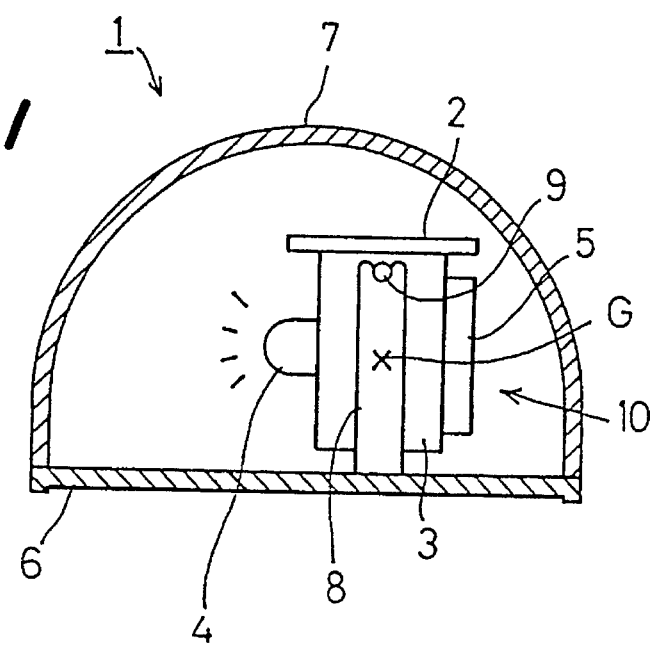
FIG. 1 is a partly cutaway side view of the light emission apparatus 1 as one embodiment of this invention.

As shown in FIG. 1, the light emission apparatus 1 incorporates a solar cell 2, a storage battery 3 such as a nickel-cadmium battery, a light-emitting diode 4, and a control unit 5, all contained in a case made up of a base 6 and a cover 7. The solar cell 2, storage battery 3, light-emitting diode 4 and control unit 5 are integrated into a light emission unit 10.

Figure 2:
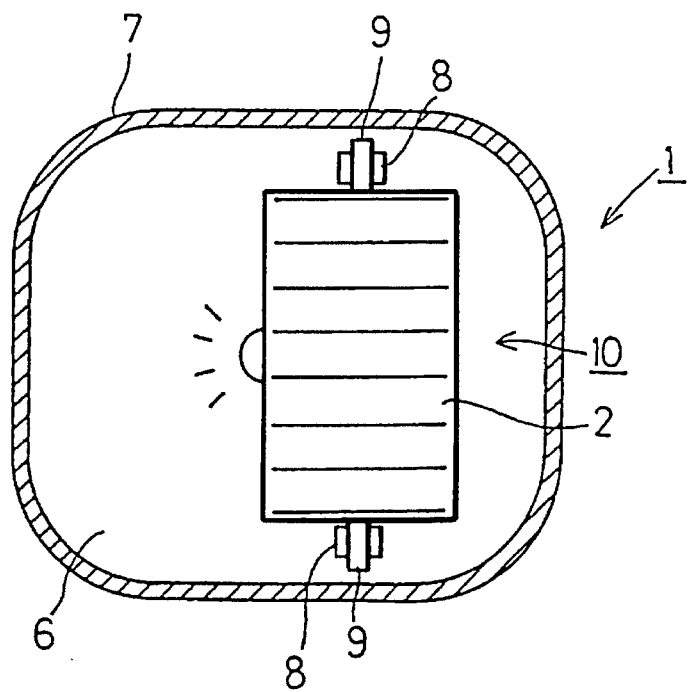
FIG. 2 is a partly cutaway top view of the light emission apparatus 1.
Figure 3:
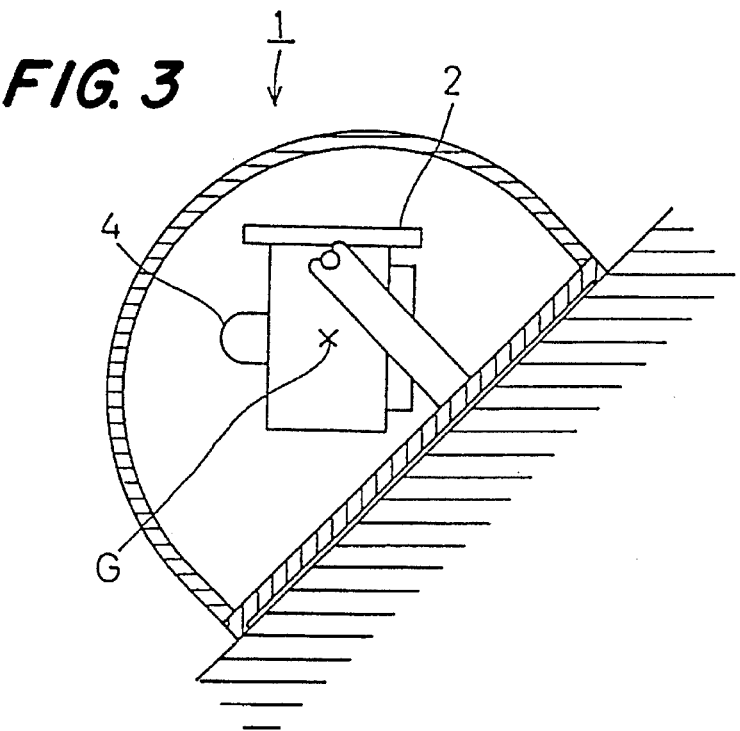
FIG. 3 is a partly cutaway side view of the light emission apparatus 1 while in use on an inclined surface.
Figure 4:
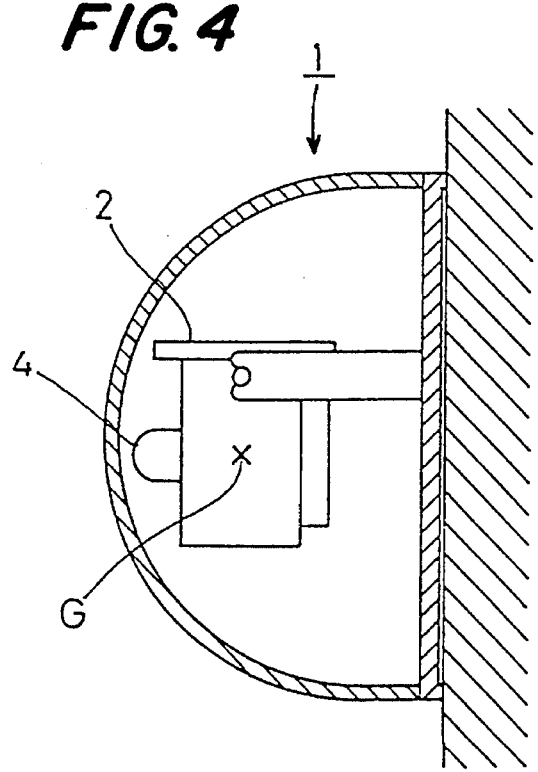
FIG. 4 is a partly cutaway side view of the light emission apparatus 1 while in use on a vertical surface.

The base 6, made from an opaque plastic, is fused to the cover 7 of a dome-shaped transparent plastic to provide an enclosed space. From the upper surface of the base 6, two bearings 8 are projected. The light emission unit 10 has shafts 9 protruding from both sides and supported on the bearings 8, as shown in FIG. 2. The center of gravity G of the light emission unit 10, as shown in FIG. 1, 3 and 4, is located opposite to the light receiving surface of the solar cell 2 with respect to the shaft 9. Hence, as shown in FIG. 3 and 4, if the light emission apparatus 1 is installed inclined or on a vertical surface, the light receiving surface of the solar cell 2 always faces upward.

Figure 5:
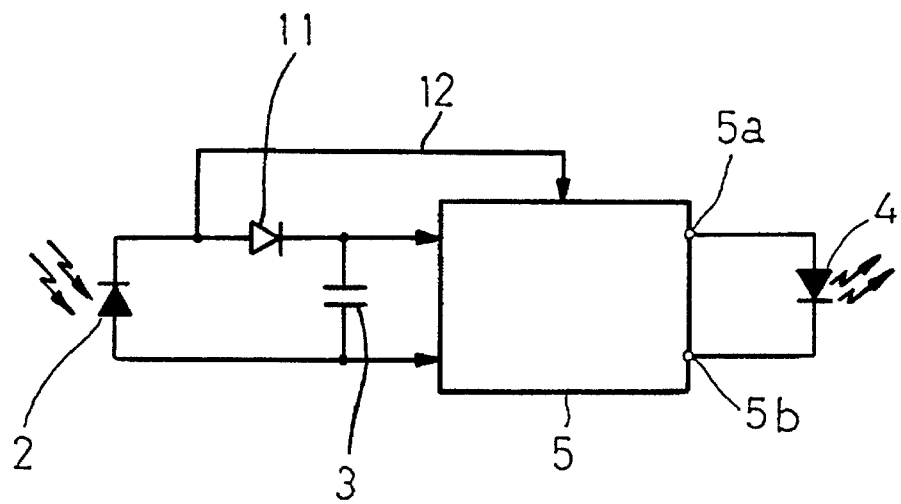
FIG. 5 is a block diagram of the light emission apparatus 1.

FIG. 5 is a block diagram of the light emission apparatus 1. In the figure, reference number 11 represents a backflow prevention diode, and 12 represents an output wire through which the output current of the solar cell 2 flows. In the control unit 5 of FIG. 6, 13 denotes a level detector circuit which is formed of a CMOS gate or analog comparator and which receives a generated electricity from the solar cell 2 by way of output wire 12 at its input terminal 13a. The level detector 13 detects a decrease or exhaustion of the generated power and outputs a power reduction signal 14a from its first output terminal 13b. Conversely, when an increase in the amount of light received by the solar cell 2 occurs, the level detector 13 produces a power increase signal 14b at its second output terminal 13c. A first timer circuit 15 is triggered by the power reduction signal 14a from the first output terminal 13b of the level detector 13 to start counting and, upon clocking the preset time, outputs a first signal. A second timer circuit 16 is triggered by the power increase signal 14b from the second output terminal 13c of the level detector 13 to start counting and, upon clocking the preset time, outputs a second signal. A flip-flop 17 is set by the first signal from the first timer circuit 15 and reset by the second signal from the secnd timer circuit 16. An oscillating circuit 18 produces a one-second-period signal. An AND circuit 19 receives the set signal output from the flig-flop 17 and the one-second-period signal from the oscillating circuit 18. 20 denotes a limiting resistor.

The first timer circuit 15 prevents the light-emitting diode 4 from blinking when a light is temporarily intercepted by a car passing near the light emission apparatus. The second timer circuit 16 prevents the light-emitting diode 4 from turning off when a light from headlight of a car strikes the light emission apparatus temporarily at night.

Next, the operation of the light emission apparatus is explained. First, as it gets dark, the amount of light received by the solar cell 2 becomes small, reducing the current flowing through the output wire 12. The level detector 13 detects a reduction in the current and outputs a power reduction signal 14a. The first timer circuit 15, upon receiving the power reduction signal, starts and, when it clocks the preset time, outputs the first signal. The first signal sets the flip-flop 17, which in turn outputs a set signal. The set signal opens the gate of the AND circuit 19, and the one-second-period signal output from the oscillating circuit 18 is fed through the AND circuit 19 and limiting resistor 20 to the light-emitting diode 4, which now blinks at 1-second intervals.

When it gets bright in the day, the amount of light received by the solar cell 2 increases, and this brings about an increase in the current flowing through the output wire 12. The level detector 13 detects an increase in the current, and outputs the power increase signal 14b. The second timer circuit 16, upon receiving the power increase signal, starts and, when it clocks the preset time, outputs the second signal. The second signal resets the flip-flop 17, closing the AND circuit 19. The AND circuit 19 therefore blocks the passage of the one-second-period signal, turning off the light-emitting diode 4. The current produced by the solar cell 2 charges the storage battery 3 through the backflow prevention diode 11.

Figure 6:
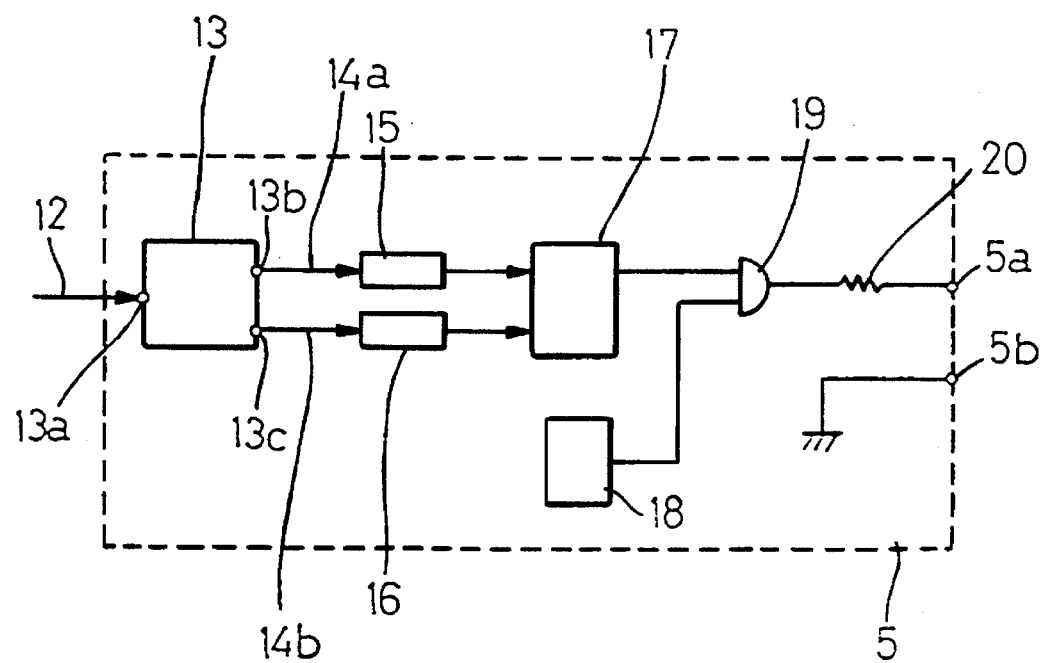
FIG. 6 is a block diagram of the control unit 5.

The block diagram of FIG. 5 and the block diagram of control unit of FIG. 6 are illustrated by way of example.

The light emission apparatus 1 can easily be mounted on any desired mount such as concrete blocks, by applying adhesives or double-faced adhesive tapes to the underside of the base 6.

Examples of horizontal mounting of the light emission apparatus, as shown in FIG. 1, include bonding to the upper surfaces of concrete objects such as boundary blocks between sidewalk and driveway and to the upper surfaces of road intersections and marker poles at construction sites. Examples of inclined mounting, as shown in FIG. 3, may include fitting to a side slope and riverbed where the apparatus may be used as decoration. Among examples of vertical mounting, as shown in FIG. 4, is bonding to building walls and breast walls as well as installation at the inlet and outlet of parking lots and tunnels and on billboards. Where the light emission apparatus is installed on a concrete block, the concrete block may be formed with a recess to accommodate the light emission apparatus 1 flush with its surface in order to prevent the apparatus from protruding.

The light emission apparatus of this invention requires no wiring work for installation. Once installed, the apparatus charges the storage battery by the solar cell in the daytime and, at night, lights up or blinks a light-emitting diode by the electricity from the storage battery. These operations are automatically switched by the control unit repetitively, requiring no maintenance at all nor payment of a utility bill.

Because a light emission unit consisting integrally of a solar cell, a storage battery, an LED and a control circuit is enclosed in a transparent case and supported on a shaft and because its center of gravity is located opposite to the solar cell's light receiving surface with respect to the shaft so that the light receiving surface always faces up, the battery can be stably charged, at whatever angle, from horizontal to vertical, or in whatever direction the light emission apparatus may be installed. Thus, in addition to a variety of concrete products, the apparatus can be used for many applications, which, for example, may include warning lights at construction sites, parking lots and the inlet and outlet of tunnels, and also as decorations of billboards. Installation of the apparatus can easily be done by means of bonding and magnets. Because the solar cell and storage battery are incorporated in the case, it is possible to achieve a desired weatherability, water resistance and strength by reinforcing the case as required.

I claim:

1. A light emission apparatus comprising:

an integral light emission unit including a solar cell, a storage battery, a light source and a control unit;

a transparent or partly transparent case containing said integral light emission unit;

a mounting member contained with said case and having said integral light emission unit pivotally mounted thereto about a pivot, wherein a light receiving surface of said solar cell and a center of gravity of said integral light emission unit are located on opposite sides of the pivot such that said light receiving surface faces upward;

wherein said control unit is operative to cause said solar cell to charge said storage battery in the presence of sunlight transmitted through said case, and is operative to cause electricity of said storage battery to continuously or intermittently illuminate said light source in the absence of sunlight transmitted through said case.

2. A light emission apparatus as claimed in claim 1, wherein said light source is a light emitting diode.

3. A light emission apparatus as claimed in claim 1, wherein said mounting member includes first and second bearing supports spaced apart and fixed to an inner wall of said case, and wherein said integral light emission unit includes first and second shafts fixed to opposite sides thereof and supported by said first and second bearing supports, respectively.

4. A light emission apparatus as claimed in claim 2, wherein said mounting member includes first and second bearing supports spaced apart and fixed to an inner wall of said case, and wherein said integral light emission unit includes first and second shafts fixed to opposite sides thereof and supported by said first and second bearing supports, respectively.

\* \* \* \* \*